UNITED STATES PATENT OFFICE.

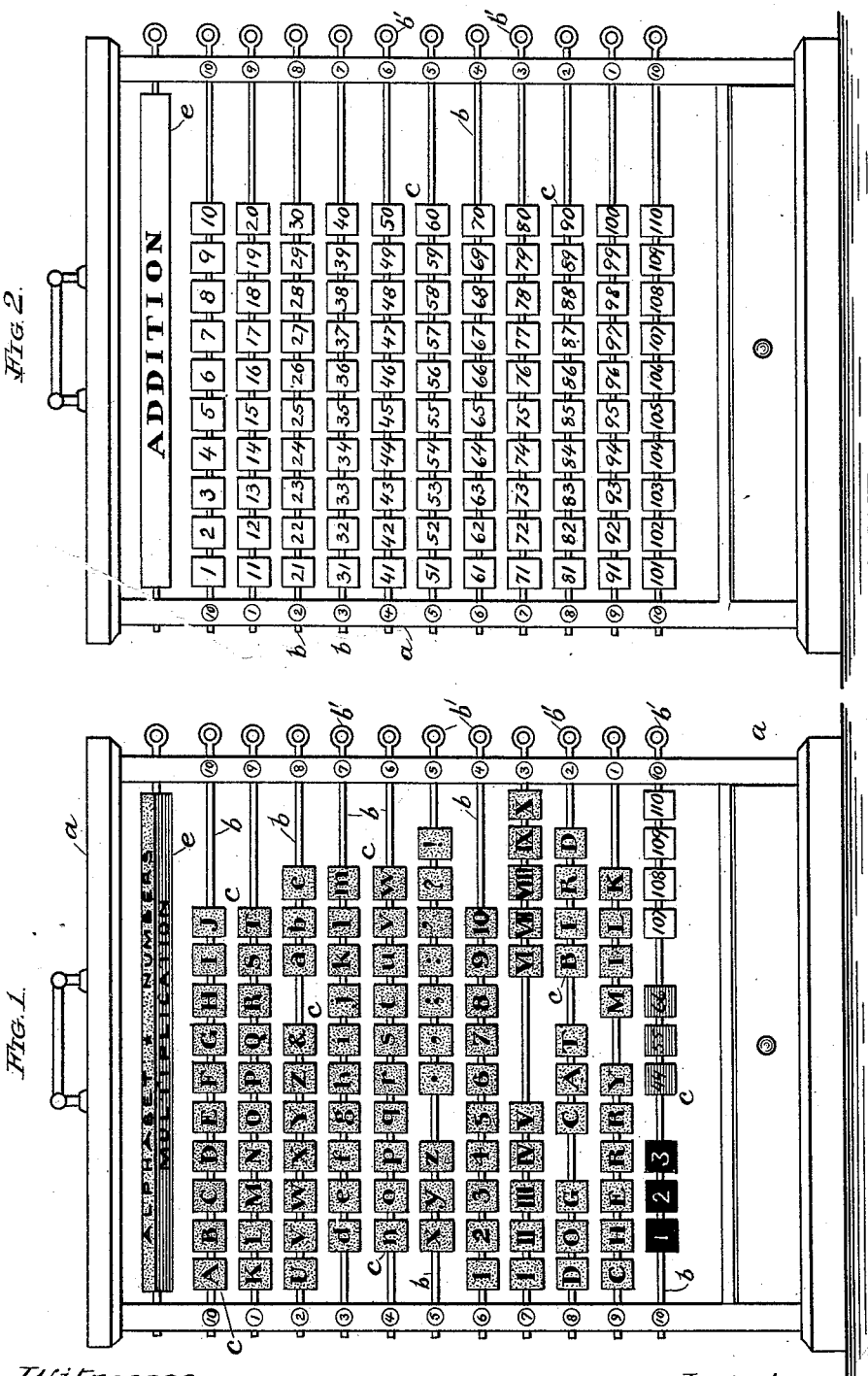

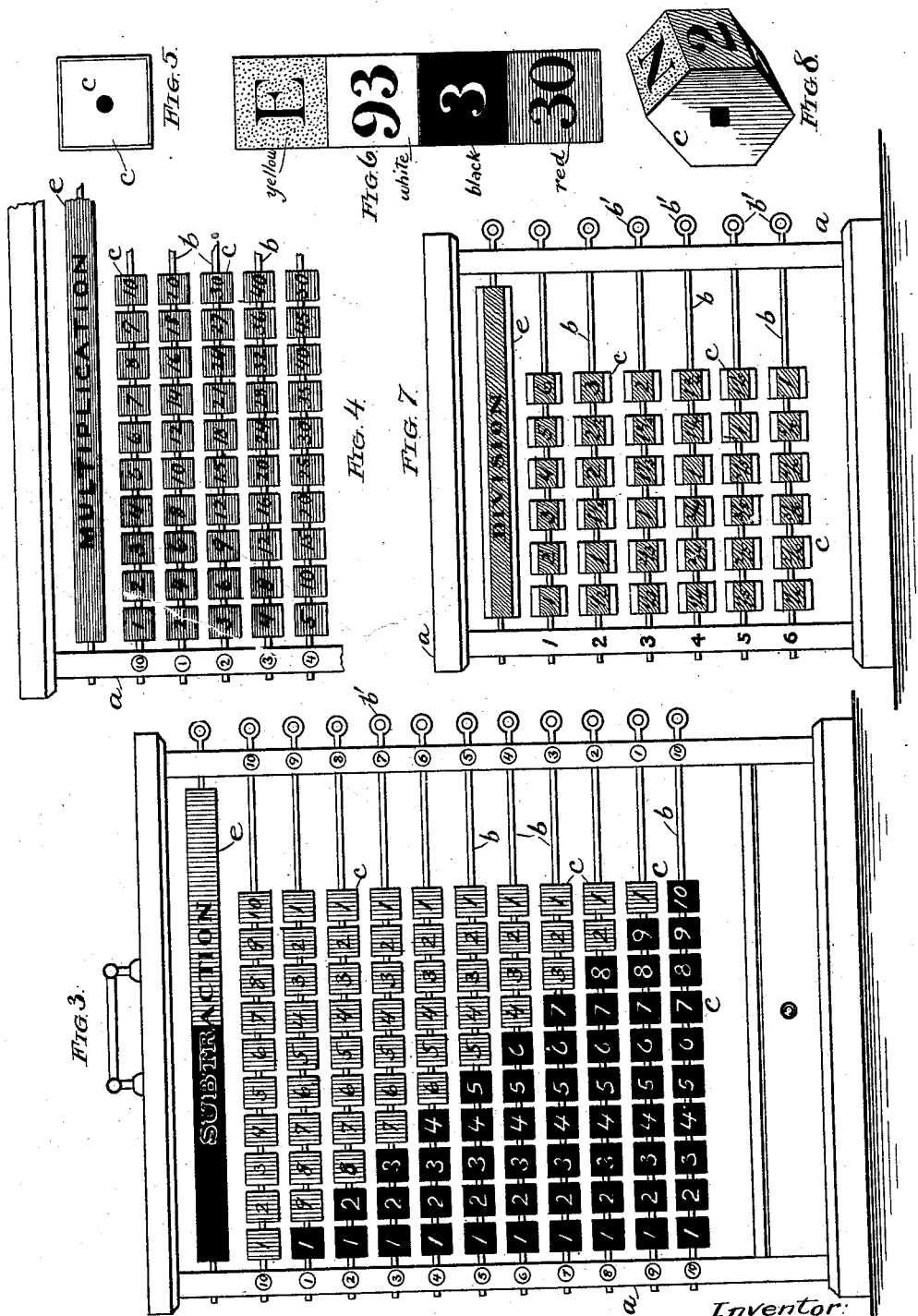

CHRISTIANA NEUHAUS, OF CHICAGO, ILLINOIS.

ABACUS.

SPECIFICATION forming part of Letters Patent No. 422,612, dated March 4, 1890.

Application filed December 23, 1889. Serial No. 334,790. (No model.)

*To all whom it may concern:*

Be it known that I, CHRISTIANA NEUHAUS, of Chicago, in the county of Cook and State of Illinois, have invented a new, useful, and Improved Educational Appliance, of which the following is a full, clear, and exact description, reference being had to the accompanying drawings, forming a part of this specification, in which—

Figure 1 is a front elevation of a frame or abacus, showing a series of lettered and numbered blocks loosely mounted thereon. Fig. 2 is a like view showing said blocks arranged for the purpose of teaching addition. Fig. 3 is a like view showing the same arranged for the purpose of teaching subtraction. Fig. 4 is a like view of a portion of said device, showing the blocks arranged thereon for the purpose of teaching multiplication. Fig. 5 is an end view in detail of one of said blocks. Fig. 6 is a face view in detail of a piece of paper, cloth, or other flexible material, having characters printed thereon in different colors, for the purpose of attaching to said blocks. Fig. 7 is a view of a modification of said invention showing hexagonal blocks arranged with a view of teaching division; and Fig. 8 is a detail view in perspective of one of said hexagonal blocks.

Like letters of reference in the different figures indicate like parts.

The object of my invention is to so construct a frame, and to combine movable blocks therewith having numbers and characters serially arranged in connection with colors conforming, respectively, with each series, that the alphabet, punctuation-marks, Roman and Arabic numerals, and the usual steps in arithmetic—such as addition, multiplication, and division—may be taught therefrom, all of which is hereinafter more particularly described and claimed.

Referring to the drawings, $a$ represents the frame of my improved device, which is preferably provided with a base of sufficient dimensions to sustain it in vertical position. Extending across said frame, parallel to each other, are a series of wires $b$, preferably eleven in number, upon which are loosely mounted square or hexagonal blocks $c$, the respective faces of which are provided with distinctive colors, according to the characters intended to be placed thereon. The blocks $c$ are made to slide loosely upon the wires, as in any well-known form of abacus, and the wires are of sufficient length to permit said blocks to separate from each other and be arranged alternately in groups, as shown in Fig. 1. Said wires may be round and secured rigidly in the frame, in which case the blocks may be revolved independently thereon, or they may be polygonal, and the respective ends loosely secured in the frame, so that the rotation of the wire serves to revolve therewith all the blanks mounted upon it. For the purpose of revolving said rods or wires they may be bent at one end, as shown at $b'$.

Assuming that addition, subtraction, multiplication, and division are to be taught, distinctive colors are chosen for the respective faces of the blocks to designate each process, and the numbers are arranged in the proper order to conform to a given process. For example, assuming that addition is to be taught, the white faces of the blocks may be chosen therefor and the numbers placed in consecutive order thereon, counting, preferably, from left to right, as shown in Fig. 2. Upon separating the blocks and grouping them, as on an ordinary abacus, the pupil may be taught to associate the number of objects in the respective groups with the number upon the blocks designating each.

For the purpose of teaching subtraction two colors should be chosen—as, for example, black and green. The first ten numerals are then arranged in consecutive order upon the uppermost wire, as shown in Fig. 3, to represent those from which subtraction is to be made. Upon the wire next below may then be placed one black face with the figure "1" thereon, and nine green faces with the numerals from 1 to 9 arranged in reverse order. Upon the next wire is placed two black and eight green faces correspondingly numbered, and so on throughout the series, the blacks increasing and the greens decreasing by one in each consecutive row, as shown in Fig. 3. The child is then shown that one object separated from ten leaves nine by actual count, and its attention is called to the figures upon the respective colored faces, which always verify the count, any teacher being able to recognize the complete system at once.

Multiplication may be taught by choosing a color, as red, for one set of the block-faces, and so arranging the numerals thereon that the number at the intersection of a vertical and horizontal row will be the product of the numbers at the beginning of said rows when multiplied together, as represented in any ordinary multiplication-table, and as clearly indicated in Fig. 4.

The process of division is represented in Fig. 7, in which a vertical column of numerals is shown upon the left-hand side of the frame, representing the respective divisors. The numerals representing the respective dividends are shown upon the upper horizontal row of blocks, and the numerals upon the remaining blocks are the quotients, respectively. It will thus be seen that the quotient in each case may be found at the intersection of the horizontal and vertical rows. For example, if a child desires to know how many times four, in the vertical column upon the frame, is contained in five, in the upper horizontal row, he looks at the intersection of the two rows and sees the quotient, one and one-fourth.

The various colors, together with the names of the respective processes for which they stand, are placed upon a revoluble bar e at the top of the frame. When the teacher desires to illustrate a certain process, the bar is turned so as to show the name of that process with the color chosen therefor, when the blocks are revolved so that the face corresponding thereto in color is brought to the front.

If six-sided blocks are used, as I prefer, the letters of the alphabet, punctuation-marks, the numerals, Arabic and Roman, as shown in Fig. 1, may be represented in connection with a given color. The capitals and small letters in script may also be shown upon the remaining face of the blocks with a separate color. Thus it will be seen that by means of my improved device the alphabet, as well as the different processes in arithmetic, may be taught in combination with colors, while at the same time it possesses the advantage that in the three first steps in arithmetic the grouping of the objects may be shown with the symbols representing them.

Having thus described my invention, I claim—

1. The combination, with a frame, of movable polygonal blocks having faces represented, respectively, by means of a distinctive color common to said respective faces throughout the series and numerals represented upon said different colored faces, respectively, in orders conforming to the primary processes of arithmetic, whereby addition, multiplication, and division may be taught by means of said blocks, according as the block-faces showing the color conforming to the process are displayed to the pupil, substantially as shown and described.

2. The combination, with a frame, of movable polygonal blocks, one face of each of which said blocks is designated by means of a distinctive color corresponding to that upon a given face of all the other blocks, numerals placed upon said faces bearing said color in orders conforming to one of the primary processes of arithmetic, in which the number placed upon a block at the intersection of the upper horizontal and left-hand vertical column may designate the final result of the step to be determined, whereby multiplication and division may be taught, substantially as shown and described.

3. The combination, with a frame, of movable polygonal blocks, each having four faces, three of which are represented, respectively, by means of a distinctive color common to said respective faces throughout the series, and one set of faces, one half of which is represented by means of a given color and the other half by a different color, said last-named colors being divided diagonally from one upper to one lower diagonal corner of the series, and numerals represented upon said different-colored faces, respectively, in orders conforming to the primary processes of arithmetic, whereby addition, subtraction, multiplication, and division may be taught by means of said blocks, according as the block-faces showing the color conforming to the process are displayed to the pupil, substantially as shown and described.

4. The combination, with the frame a and rods b, of the revoluble polygonal blocks c, colored and numbered as specified, and the revoluble bar e, colored and labeled substantially as shown and described.

In testimony whereof I have signed this specification, in the presence of two subscribing witnesses, this 10th day of December, 1889.

CHRISTIANA NEUHAUS.

Witnesses:
D. H. FLETCHER,
J. HALPENNY.